Nov. 26, 1957    J. E. O'DONNELL    2,814,217
APPARATUS FOR BORING POLYGONAL HOLES
Filed March 28, 1955                2 Sheets-Sheet 1

INVENTOR.
JAMES E. O'DONNELL
BY
Heard, Smith, Porter & Chittick
ATTORNEYS

Nov. 26, 1957 J. E. O'DONNELL 2,814,217
APPARATUS FOR BORING POLYGONAL HOLES
Filed March 28, 1955 2 Sheets-Sheet 2
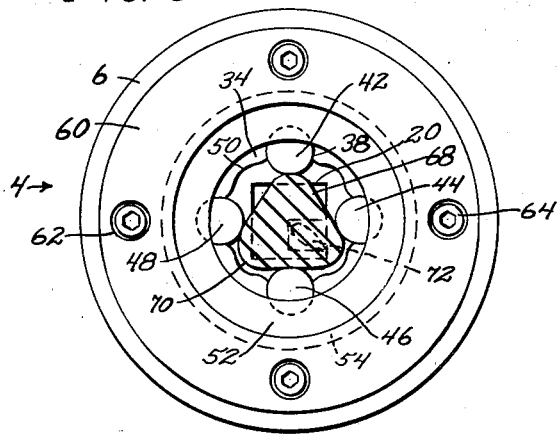
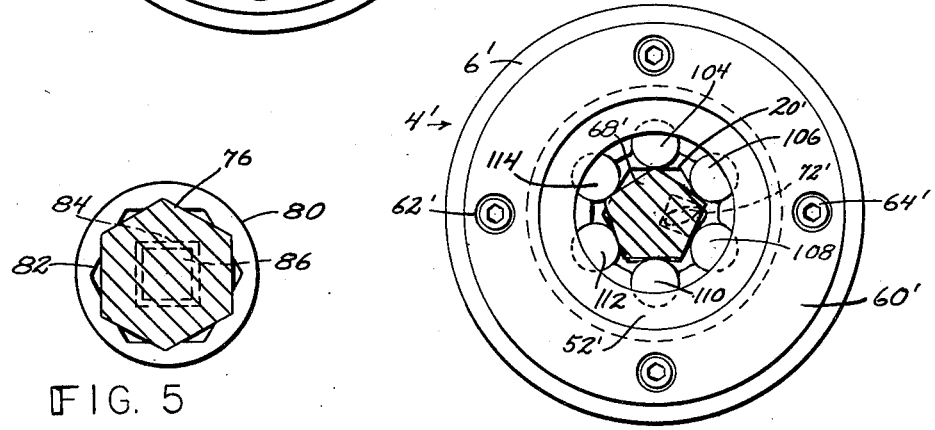
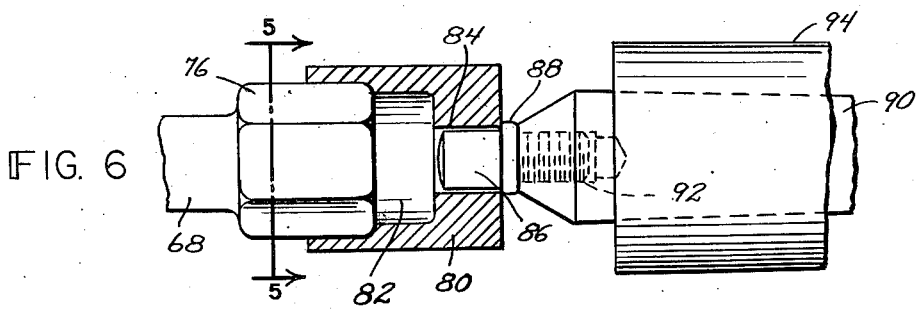
INVENTOR.
JAMES E. O'DONNELL
BY
Heard, Smith, Porter + Chittick
ATTORNEYS

United States Patent Office 2,814,217
Patented Nov. 26, 1957

2,814,217

APPARATUS FOR BORING POLYGONAL HOLES

James E. O'Donnell, Lynn, Mass.

Application March 28, 1955, Serial No. 496,976

4 Claims. (Cl. 77—61)

This invention relates to apparatus for boring holes of polygonal shape.

More particularly this invention relates to a device adapted to be used with a lathe for forming holes with straight side peripheries, such as square and hexagonal holes.

The object of this invention is to provide a simple, efficient and inexpensive device for boring holes of polygonal configuration, the device comprising a non-rotating boring tool and a rotating work holder which includes means for guiding and supporting the tool in such a manner as to cause it to cut polygonal holes in a rotating work piece secured by the holder.

Another object of this invention is to provide in combination with a lathe, means for boring holes of polygonal configuration in a work piece supported on the lathe.

Other objects and many of the attendant advantages of this invention will be readily appreciated as the same becomes better understood by reference to the following detailed description when considered in connection with the accompanying drawings, wherein:

Fig. 3 is an end view of the adaptor of Figs. 1 and 2;

Fig. 4 is an end view of a modified form of the adaptor;

Fig. 5 is a sectional view taken along line 5—5 of Fig. 6; and,

Fig. 6 is a side view partially in section showing the rear end of the knife holder or cutting tool supported in the tail stock of the lathe.

Although the present invention is intended to be used with a conventional lathe, and in one respect may be construed as including a lathe, only so much of the lathe is shown as is necessary to facilitate comprehension and appreciation of the novel features of the invention.

Figure 1:
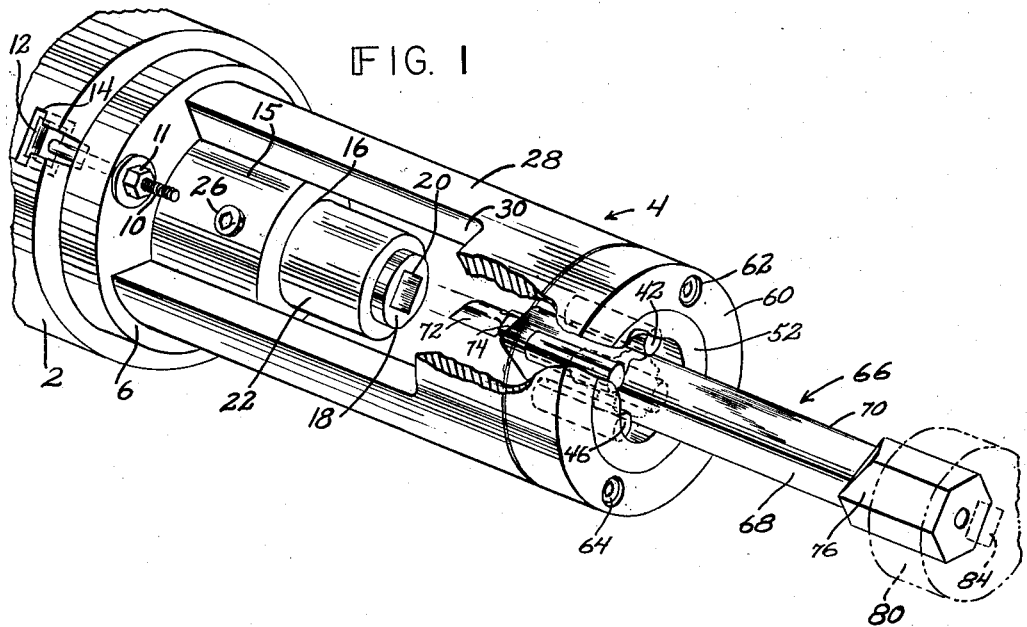
Fig. 1 is a perspective view showing an adaptor constructed according to the present invention mounted on the head plate of the lathe and a boring tool also constructed according to the present invention, the boring tool being supported by the adaptor in non-cutting relation to a work piece supported in the adaptor.

Referring now to Fig. 1, there is shown the face plate 2 of a conventional lathe, which face plate is a rotatable part of the head stock of the lathe. Secured to face plate 2 is an adaptor assembly constructed according to the present invention and generally designated at 4. The adaptor assembly has an end plate 6 which is bolted to face plate 2. Although only one bolt 10 and one nut 11 are shown, it is to be understood that several bolts and nuts are employed for this purpose, the bolts being circumferentially spaced with their heads 12 retained in a plurality of grooves similar to grooves 14 in face plate 2. The bolts extend through holes provided in end plate 6. Welded to end plate 6 and extending outwardly in coaxial relation therewith is a solid cylindrical work support element 15 having a cylindrical cavity 16 at its forward end.

Figure 2:
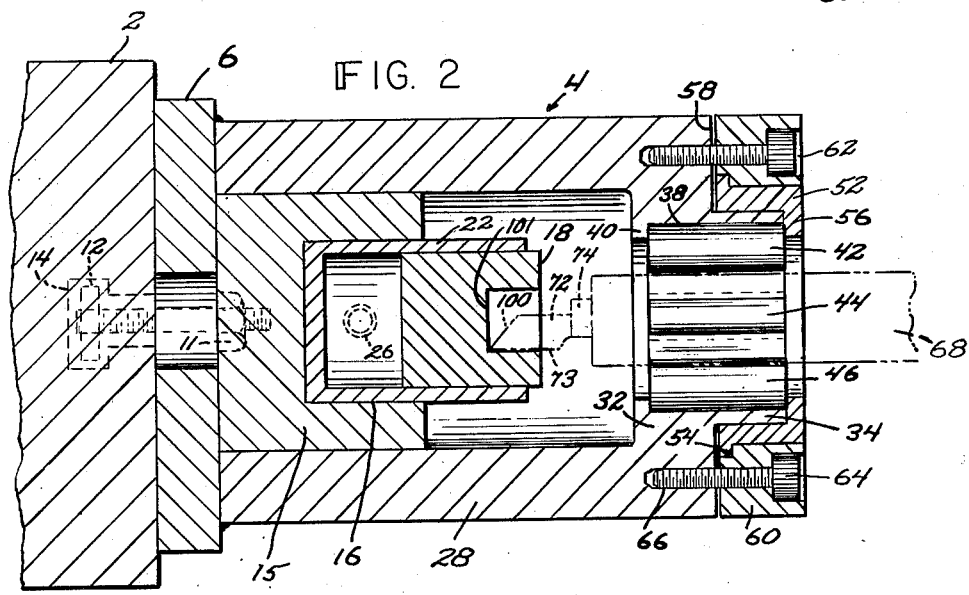
Fig. 2 is a sectional view of the adaptor and a work piece carried by the adaptor, the view being taken along the longitudinal axis.

The purpose of cavity 16 is to accommodate a work piece 18 in which a square hole 20 is to be made as explained hereinafter. Although the work piece 18 as illustrated in Figs. 1 and 2 is shown to have a square hole 20 bored in its forward end, it is to be understood that the work piece initially is a solid piece. In Figs. 1 and 2 the outside diameter of the work piece 18 is seen to be smaller than the diameter of cavity 16, and an insert sleeve 22 is employed to receive work piece 18. In practice a brass sleeve has been found suitable as an insert, the work piece 18 being forced into the insert in a tight fit so as to be rotatable therewith. A set screw 26 is mounted in a hole in the wall of work support element 15 and acts to maintain insert 22 fixed with respect to the work support 15. Where the work piece is found to have the correct diameter, the insert sleeve 22 may be dispensed with and the work piece inserted directly in cavity 16 so that it may be engaged by set screw 26.

Also welded to end plate 6 in concentric relation to work holder 15 is a sleeve 28 whose free end extends beyond the work piece 18. Sleeve 28 is slotted or cut away as indicated at 30, and also at a diametrically opposite region, not shown, so as to provide access to work holder 15 to permit insertion and removal of the work piece.

The forward end of sleeve 28 has an inwardly extending flange 32 (Fig. 2) provided with an extension 34 at its forward end. Extension 34 is in coaxial relation to sleeve 28. Extension 34 has a circular periphery and its interior surface is provided with four grooves 38 in quadrilateral relation (Fig. 3). Grooves 38 each cover an arc slightly in excess of 180°. Grooves 38 extend into flange 32 to a limited extent terminating in a shoulder 40. Extension 34 acts as a cage or race for bearings 42, 44, 46, and 48, each of which resides in one of the grooves 38 which may be likened to sockets for the bearings. Since the wall of each groove 38 extends about more than half of the cylindrical surface of the roller bearing residing in the groove, the bearings are prevented from falling out of the grooves inwardly in a radial direction. However, it is to be understood that the grooves still permit the bearings to rotate freely therein. Shoulder 40 prevents the bearings from moving toward work support 15. The interior surface of extension 34 is provided with additional arcuate grooves 50 spaced intermediate grooves 38. The purpose of grooves 50 is to provide clearance for the knife or cutting tool holder, as hereinafter explained. Removably positioned on extension 34 in a snug fit is a cylindrical retaining ring 52 having an exterior flange 54 at one end and an interior flange 56 at the other end. Flange 54 engages the forward end wall 58 of sleeve 28. Flange 56 overlies the end of extension 34 and partially encloses the four roller bearings 42, 44, 46, and 48 so as to prevent them from moving axially away from shoulder 40.

A collar 60 surrounds ring 52 and is provided with an interior groove for accommodating peripheral flange 54 of ring 52. Collar 60 has four countersunk holes 62 for receiving bolts 64 which are threaded into tapped openings 66 in the free end of sleeve 28. The assembly as disclosed in Figs. 1 and 2, being carried by the head plate 2 of the lathe head stock, rotates with the face plate 2 when the lathe is operated.

Employed in conjunction with the adaptor of Figs. 1 and 2 and forming part of the present invention is a cutting tool generally indicated at 66 having an elongated body or holder 68 of triangular cross section provided at one end with a knife blade or cutting head 72. The knife head 72 has a square body section 74 which is force fitted into a tapped opening in the end of the cutting tool body 68. The edge 73 of the cutting tool coincides with one of the rounded corners 70 of the cutting tool body 68. At its rear end the cutting tool body is enlarged and the exterior surface at said rear end is of hexagonal shape as indicated at 76. The hexagonal rear end of the cutting tool is mounted in a socket wrench 80 provided with a large opening 82 at its forward end. Opening 82 corresponds in cross section to a 12-sided polygon. The rear end of socket wrench 80 is provided with a square hole 84 for loosely receiving the square head 86 of a bolt 88. The bolt 86 is secured or threaded in a tapped opening 92 especially provided in a tail stock center 90. The tail stock center is carried by the tail stock spindle 94 of a conventional lathe.

The knife head or bit 72 is preferably formed of high speed steel and, although it is shown mounted in the holder 68 by means of a tight fit, it is also to be understood that the knife may be secured therein by means of a set screw arrangement. The knife holder 68 may be made of ordinary cold rolled steel of hexagonal shape and machined into the triangular cross section illustrated in Figs. 1 and 3. In practice it has been found that a hole measuring about $9/16''$ square is formed when the knife holder measures $11/16''$ from apex to base, the knife or bit measures $5/16''$ from one edge to the other, successive roller bearings are spaced $12/16''$ from each other, and the roller bearings have a diameter of $9/16''$. The edge of the bit or knife need not extend radially to coincide with the edge or corner of the holder. It may terminate short of the corner as illustrated in Fig. 3. In practice, before the illustrated device is used to bore a hole in the work piece 18, a small hole is drilled in the work piece centrally of the hole that is to be made with the cutting tool. Where the bit measures about $5/16''$ across, the initial hole may have a diameter of approximately $1/4''$. The front edge 100 of the knife should be at an angle, this permitting the initial hole that must be bored to be maintained to a minimum, e. g. $1/4''$. After the initial hole has been made, the illustrated tool is used to make a polygonal hole as described hereinafter.

Assuming that the adaptor is mounted on the head plate 2 of the lathe and the work piece 18 is mounted in work holder 14, and that the knife holder is supported in the socket wrench loosely carried by the bolt attached to the tail stock center, operation of the illustrated device is as follows: The tail is moved toward the head stock so that the knife holder extends through the central opening at the forward end of the adaptor and is supported by the roller bearings 42—48. The lathe is then actuated so as to cause rotation of the face plate 2, and the knife blade and work piece are brought into engagement with each other so that the forward end of the knife blade resides in the small hole previously made in the work piece. As the adaptor assembly rotates the leading edge of the knife blade or bit commences to gouge out portions of the work piece, enlarging the small hole.

As shown in Figs. 1, 2, and 3, the sides of the knife holder 68 are guided by the roller bearings. As the assembly rotates the roller bearings move around the knife holder, moving first around one corner, then along the side, then around the next corner, and so on, of the knife holder. This causes the knife holder to oscillate laterally of its longitudinal axis. When the roller bearings and the knife holder are in the position illustrated in Fig. 3, i. e. when the corner of the knife holder toward which the cutting edge of the knife is directed resides between rollers 44 and 46, the edge of the knife is caused to cut a right angle corner. Assuming that the assembly rotates clockwise, as seen in Fig. 3, the corner of the knife holder is engaged by the roller bearing 44 and is cammed by it to one side so that its opposite flat side rests on the diametrically opposite roller bearing 48. As the assembly then continues to rotate the knife edge cuts out one of the straight sides of the hole. When the roller 44 passes around the corner of the holder at which the knife edge is directed, the holder will be forced by rollers 46 and 48 to move in between rollers 42 and 44 to cut out the next corner. As the assembly continues to rotate, the four corners of the hole 20 are successively cut. The knife holder never rotates, its only movement being in a lateral direction as determined by the camming action of the roller bearings. When the hole has been cut to the proper depth, the tailstock is shifted to move the bit away from the work piece. During the cutting operation the tailstock spindle is moved toward the head stock so that the knife or bit is caused to progress further into the interior of the work piece to increase the depth of the hole being cut. The bit need not be withdrawn entirely from the adaptor to permit the work piece to be removed.

Fig. 4 illustrates a modified form of the invention. In this second embodiment the adaptor 4' is substantially the same as the adaptor 4 illustrated in Figs. 1, 2, and 3, except that six roller bearings 104, 106, 108, 110, 112, and 114, are positioned in six grooves 38' provided in an extension 34' corresponding to extension 34 of the first embodiment. Elements 6', 52', 60', 62', 64', are identical to elements 6, 52, 60, 62, and 64 of the first embodiment. The knife holder employed with the modified form of the adaptor is shown in cross section at 68'. It is seen to have five sides and the knife blade or bit 72' secured at its forward end is positioned so that its cutting edge is directed at one of the corners formed by two of its five sides. Although not shown it is to be understood that except as already noted the knife holder 68' is identical to holder 68 and that its rear end is of hexagonal cross-section so as to be supported by socket wrench 80.

The modified form of the invention shown in Fig. 4 operates substantially the same as the first embodiment, with the roller bearings camming the knife holder as the adapter rotates. However, by this latter form of the invention a six-sided hole 20' is gouged out by knife 72'.

It has been found that the holes cut by the two illustrated embodiments are substantially regular and are formed without difficulty when the head plate is rotating at a speed of approximately 350 R. P. M. Moreover, the invention in operation exhibits a surprisingly small amount of chatter. One of its foremost advantages is that it is simple to construct and operate. Furthermore, the bottom 101 of the hole is quite flat. Still another advantage is that the invention may be modified to make holes of other shapes, e. g. 5, 7, 8, and 9-sided holes by simply modifying the shape of the knife holder and varying the number of roller bearings. In each case the roller bearings must be equal in number to the number of sides of the hole to be bored, and the sides of the knife holder must total one less in number.

Another advantage of the aforesaid invention is that it is capable of boring holes in steel, brass, aluminum, or similar metals, with substantially equal ease and speed.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practiced otherwise than as specifically described or illustrated.

I claim:

1. Apparatus for facilitating formation of a polygonal hole in a work piece by means of a non-rotating boring tool, said apparatus comprising a work holder having a central axis and adapted to support a work piece in alinement with said axis, a plurality of camming elements, means supporting said cam elements in a circular arrangement whereby to define a central opening thereamong for receiving said boring tool, the center of said opening being in alinement with said axis, means fixedly connecting said supporting means and work holder whereby to maintain said camming elements in spaced relation with said holder, and means for mounting said apparatus for rotation on said axis.

2. Apparatus for boring polygonal holes in a work piece comprising, a rotatable plate, means for rotating said plate, a work holder, means releasably securing said work holder to said plate for rotation therewith, a tool guide connected to said work holder and spaced therefrom, said tool guide being rotatable with said work holder and plate, said tool guide having a plurality of spaced camming surfaces defining a central opening in alinement with said work holder and the axis of rotation of said plate, a boring tool having a cutting element at one end, and means loosely supporting said boring tool at its opposite end in substantial alinement with said central opening, said tool supporting means acting to prevent rotation of said boring tool, said supporting means being mounted for movement toward and away from said plate whereby said tool may be positioned in said central opening and brought into and out of engagement with a work piece mounted in said holder.

3. Apparatus as defined by claim 2, wherein said plate and means for rotating said plate comprise part of the head stock assembly of a lathe, and said means for supporting said boring tool is carried by the tail stock assembly of the same lathe.

4. In apparatus for boring polygonal holes in a work piece, the combination comprising a rotatable stock, a work holder attached at one end to said stock and rotatable therewith for holding a work piece in alinement with the axis of rotation of said stock, a cylindrical sleeve concentric with and extending beyond the opposite end of said work holder, said sleeve being fixedly connected to said work holder, a plurality of rolls disposed in a circle concentric to said sleeve, each roll being rotatable on its own axis, and fixed means carried by said sleeve supporting said rolls for rotation with said sleeve.

References Cited in the file of this patent
UNITED STATES PATENTS

| | | |
|---|---|---|
| 456,258 | Hutton et al. | July 21, 1891 |
| 1,270,144 | Gallimore | June 18, 1918 |
| 1,401,702 | Husted | Dec. 27, 1921 |
| 1,407,419 | Husted | Feb. 21, 1922 |

FOREIGN PATENTS

| | | |
|---|---|---|
| 54,878 | Maier | Jan. 3, 1891 |